(12) United States Patent
Weschke et al.

(10) Patent No.: US 8,268,150 B2
(45) Date of Patent: Sep. 18, 2012

(54) WORKPIECE CARRIER FOR CONVEYING A WORKPIECE TO BE PAINTED

(75) Inventors: Jürgen Weschke, Weil der Stadt (DE); Konrad Ortlieb, Stuttgart (DE); Hidayet Kisi, Heilbronn (DE); Thomas Telgen, Aldenhoven (DE)

(73) Assignee: Durr Systems GmbH, Bietigheim-Bissingen (DE)

( * ) Notice: Subject to any disclaimer, the term of this patent is extended or adjusted under 35 U.S.C. 154(b) by 716 days.

(21) Appl. No.: 12/437,697

(22) Filed: May 8, 2009

(65) Prior Publication Data

US 2009/0250346 A1   Oct. 8, 2009

Related U.S. Application Data

(63) Continuation of application No. PCT/EP2007/009723, filed on Nov. 9, 2007.

(30) Foreign Application Priority Data

Nov. 23, 2006  (DE) .................. 10 2006 055 297

(51) Int. Cl.
*C25D 13/12* (2006.01)
(52) U.S. Cl. ...................................... 204/512; 204/623
(58) Field of Classification Search .................. 204/512, 204/623
See application file for complete search history.

(56) References Cited

U.S. PATENT DOCUMENTS

| | | |
|---|---|---|
| 1,927,634 A | 9/1933 | Fahrenwald |
| 1,992,467 A | 2/1935 | Blythe |
| 2,077,189 A | 4/1937 | Rishel |
| 2,105,973 A | 1/1938 | Hereford |
| 2,797,006 A | 6/1957 | Thompson |
| 2,818,156 A | 12/1957 | Edwards |
| 2,890,802 A | 6/1959 | Alimanestiano |
| 3,204,785 A | 9/1965 | Bajulaz |
| 3,402,481 A | 9/1968 | LaPan |
| 3,433,236 A | 3/1969 | Koch et al. |
| 3,968,559 A | 7/1976 | Karlsson |
| 4,248,341 A | 2/1981 | Schuck et al. |
| 4,343,395 A | 8/1982 | Lippert et al. |
| 4,564,100 A | 1/1986 | Moon |
| 4,620,373 A | 11/1986 | Laskowski |
| 4,774,773 A | 10/1988 | Zwyssig |
| 4,894,909 A | 1/1990 | Sakamoto et al. |
| 4,901,845 A | 2/1990 | Zorgiebel |
| 4,951,802 A | 8/1990 | Weissgerber et al. |

(Continued)

FOREIGN PATENT DOCUMENTS

CH   254872 A   5/1948

(Continued)

*Primary Examiner* — Kishor Mayekar
(74) *Attorney, Agent, or Firm* — Leydig, Voit & Mayer, Ltd.

(57) ABSTRACT

In order to create a workpiece carrier for conveying a workpiece to be painted, in particular, a vehicle body through at least one electrophoretic dip paint bath and by means of at least one conveyor device following the electrophoretic dip paint bath, comprising at least one electrical contacting device for passing a coating current into the workpiece when the workpiece is conveyed through the electrophoretic dip paint bath and at least one contact surface, at which the workpiece carrier comes into contact with the conveyor device following the electrophoretic dip paint bath, with which dip paint is prevented from rubbing off in the conveyor device following the electrophoretic dip paint bath, it is suggested that at least one contact surface be electrically insulated from the at least one contacting device.

40 Claims, 4 Drawing Sheets

U.S. PATENT DOCUMENTS

| | | |
|---|---|---|
| 5,037,263 A | 8/1991 | Yamashita |
| 5,116,182 A | 5/1992 | Lin |
| 5,217,374 A | 6/1993 | Birks |
| 5,242,045 A | 9/1993 | Kakida et al. |
| 5,263,267 A | 11/1993 | Buttner et al. |
| 5,494,561 A | 2/1996 | Darche et al. |
| 5,553,988 A | 9/1996 | Horn et al. |
| 5,556,466 A | 9/1996 | Martin et al. |
| 5,661,912 A | 9/1997 | Bhatnagar et al. |
| 5,873,165 A | 2/1999 | Bode et al. |
| 6,197,175 B1 | 3/2001 | Kisi et al. |
| 6,269,941 B1 | 8/2001 | Ueno |
| 6,455,817 B1 | 9/2002 | Guzzi et al. |
| 6,557,268 B1 | 5/2003 | Berg et al. |
| 6,990,749 B2 | 1/2006 | Roesler et al. |
| 2001/0030108 A1 | 10/2001 | Hansen |
| 2003/0042113 A1 | 3/2003 | Kasagi |
| 2004/0032061 A1 | 2/2004 | Sachse et al. |
| 2005/0194234 A1 | 9/2005 | Schmohl et al. |
| 2007/0261264 A1 | 11/2007 | Ortlieb et al. |
| 2007/0261953 A1 | 11/2007 | Kohler et al. |

FOREIGN PATENT DOCUMENTS

| | | |
|---|---|---|
| DE | 47 113 | 5/1889 |
| DE | 1 754 378 U | 10/1957 |
| DE | 1 060 420 | 7/1959 |
| DE | 2031105 A | 1/1971 |
| DE | 2130610 A1 | 12/1972 |
| DE | 23 24 393 C3 | 11/1973 |
| DE | 2245991 A1 | 7/1974 |
| DE | 2451056 A1 | 5/1976 |
| DE | 2031105 B2 | 5/1979 |
| DE | 2031105 C3 | 1/1980 |
| DE | 28 38 974 C2 | 3/1980 |
| DE | 8321727 U1 | 12/1983 |
| DE | 3439860 A1 | 3/1986 |
| DE | 3439860 C2 | 10/1987 |
| DE | 40 07 707 A1 | 9/1990 |
| DE | 4041211 C1 | 1/1992 |
| DE | 42 33 970 C2 | 9/1993 |
| DE | 42 22 349 A1 | 1/1994 |
| DE | 44 30 882 A1 | 3/1996 |
| DE | 19839725 C1 | 3/2000 |
| DE | 19936879 C1 | 9/2000 |
| DE | 19942556 A1 | 3/2001 |
| DE | 19950202 A1 | 5/2001 |
| DE | 201 04 205 U1 | 8/2001 |
| DE | 100 62 084 A1 | 6/2002 |
| DE | 203 04 601 U1 | 6/2003 |
| DE | 202 11 083 U1 | 8/2003 |
| DE | 10238493 A1 | 3/2004 |
| DE | 103 25 656 B3 | 7/2004 |
| DE | 102004008812 A1 | 9/2005 |
| DE | 102004011254 A1 | 9/2005 |
| DE | 102004056404 A1 | 5/2006 |
| DE | 102004061791 A1 | 7/2006 |
| DE | 202004021146 U1 | 12/2006 |
| DE | 102006030334 A1 | 1/2008 |
| EP | 0 149 694 A1 | 7/1985 |
| EP | 0 255 620 A2 | 2/1988 |
| EP | 0 436 081 A1 | 7/1991 |
| EP | 0581687 A1 | 2/1994 |
| EP | 0 649 919 B1 | 4/1995 |
| EP | 1055895 A1 | 11/2000 |
| EP | 1 424 268 A2 | 6/2004 |
| EP | 1 510 477 A1 | 3/2005 |
| FR | 1 076 870 | 5/1953 |
| FR | 2756815 A1 | 6/1998 |
| FR | 2 785 884 A1 | 5/2000 |
| GB | 120809 A | 11/1918 |
| GB | 462838 A | 3/1937 |
| GB | 844309 | 8/1960 |
| GB | 1 203 789 A | 9/1970 |
| GB | 1310971 A | 3/1973 |
| JP | 54-163483 | 12/1979 |
| JP | 03-159886 | 7/1991 |
| JP | 03-186510 | 8/1991 |
| JP | 8-246194 A | 9/1996 |
| WO | WO 99/04209 A1 | 1/1999 |
| WO | WO 02/47894 A1 | 6/2002 |
| WO | WO 2004/018333 A1 | 3/2004 |
| WO | WO 2004/081476 A1 | 9/2004 |
| WO | WO 2004/081476 B1 | 1/2005 |
| WO | WO 2006/056318 A1 | 6/2006 |
| WO | WO 2006/066920 A1 | 6/2006 |
| WO | WO 2008/000345 A1 | 1/2008 |

WORKPIECE CARRIER FOR CONVEYING A WORKPIECE TO BE PAINTED

This application is a continuation of international application number PCT/EP2007/009723 filed on Nov. 9, 2007.

The present disclosure relates to the subject matter disclosed in international application number PCT/EP2007/009723 of Nov. 9, 2007 and German application number 10 2006 055 297.0 of Nov. 23, 2006, which are incorporated herein by reference in their entirety and for all purposes.

BACKGROUND OF THE INVENTION

The present invention relates to a workpiece carrier for conveying a workpiece to be painted, in particular, a vehicle body through at least one electrophoretic dip paint bath and by means of at least one conveyor device which follows the electrophoretic dip paint bath, the carrier comprising at least one electrical contacting device for passing a coating current into the workpiece when the workpiece is conveyed through the electrophoretic dip paint bath and at least one contact surface, at which the workpiece carrier comes into contact with the conveyor device following the electrophoretic dip paint bath.

Workpiece carriers of this type are known from the state of the art and can be designed, in particular, as skid frames.

A "skid frame" is to be understood as a workpiece carrier which has at least two skid runners which are aligned along the direction of conveyance of the workpiece and spaced from one another transversely to the direction of conveyance of the workpiece, wherein each skid runner has a contact surface for supporting the skid frame on the conveyor device.

In this respect, the skid runners of the skid frame can be mounted directly on the workpiece so that the workpiece itself undertakes the connection of the skid runners with one another. The term "skid frame", as used in this description and in the attached claims, also comprises a configuration, with which the skid runners are mounted directly on the workpiece without being connected to one another by crossbars.

If skid conveyor technology is used for conveying vehicle bodies through the pretreatment baths and the electrophoretic dip paint bath of a paint plant, each vehicle body will be placed on a dip skid frame when entering the pretreatment area or already as a body-in-white and then passes through the pretreatment baths, the electrophoretic dip paint bath and also the drier following the electrophoretic dip paint bath on this skid frame. Subsequently, the vehicle body is changed to another skid frame, on which the vehicle body is conveyed through a subsequent spray paint section of the paint plant.

The dip skid frame, on which the vehicle body is conveyed through the electrophoretic dip paint bath, is normally manufactured from black normal steel. When these skid frames are brought into operation they travel through the pretreatment baths and the electrophoretic dip paint bath as well as the dip paint drier. In this respect, the skid frame is coated with dip paint. In the dip paint drier, this paint coating will be hardened and then serves as a protection against corrosion for the skid frame.

This paint protection layer is maintained on the skid frame, apart from the coating of the contact surfaces on the skid runners and apart from places on the locking mechanisms between the skid frame and the vehicle body. The paint coating on the skid runners will be rubbed off by the conveyor technology arranged between the exit from the electrophoretic dip paint plant and the entry into the drier at the places where contact is made between the conveyor technology and the skid frame. The holding time in this section is approximately 15 minutes in order to allow the paint sufficient time to run out of slits in the vehicle body.

The sticky paint which is rubbed off the skid runners in this conveyor section and is not yet hardened will be distributed in this way in the entire conveyor technology connecting the electrophoretic dip paint bath to the drier and must be cleaned off manually during operational stoppages of the paint plant, for example, at weekends.

This soiling with rubbed-off paint is even to be found in the cooling zone of the drier after the paint on the vehicle body has successfully hardened. Whereas the paint on the surface of the vehicle body remains for a sufficient time at the hardening temperature, the underside of the skid runners is, on the one hand, not subjected to the flow of hot air in the dip paint drier and cannot, on the other hand, be heated up quickly enough, on account of the large mass of the skid runners, and so the paint on the underside of the skid runners leaves the drier uncured.

The object underlying the present invention is to create a workpiece carrier of the type specified at the outset, with which dip paint is prevented from rubbing off in the conveyor device following the electrophoretic dip paint bath.

SUMMARY OF THE INVENTION

This object is accomplished in accordance with the invention, in a workpiece carrier having the features of the preamble to claim 1, in that at least one contact surface, at which the workpiece carrier comes into contact with the conveyor device following the electrophoretic dip paint bath, is electrically insulated from the at least one electrical contacting device.

As a result of the electrical insulation of the contact surface from the contacting device, by means of which the coating current is passed into the workpiece when the workpiece is conveyed through the electrophoretic dip paint bath, no coating current will reach the contact surface and so there is no build up of dip paint which can be rubbed off by the conveyor technology at the contact surface where rubbing contact later takes place between the workpiece carrier and the conveyor technology.

As a result of the solution according to the invention, dip paint is prevented from rubbing off from the workpiece carrier in the conveyor device following the electrophoretic dip paint bath and the complicated cleaning of large areas of the conveyor technology connecting the electrophoretic dip paint bath to the dip paint drier during operational stoppages of the paint plant is superfluous.

In one preferred development of the workpiece carrier according to the invention, the workpiece carrier comprises a workpiece receiving area, at which the workpiece is held, and a contact area of the conveyor device which has at least one contact surface, at which the workpiece carrier comes into contact with the conveyor device following the electrophoretic dip paint bath.

In principle, it could be provided for the contact surface of the contact area of the conveyor device to be formed from an electrically non-conducting material so that the contact surface is already insulated electrically from the electrical contacting device as a result and, therefore, will not be coated in the electrophoretic dip paint bath.

Alternatively or in addition hereto, it may, however, also be provided for the workpiece receiving area and the contact area of the conveyor device with the contact surface to be electrically insulated from one another.

In this case, the contact area of the conveyor device with the contact surface can certainly be formed from an electrically conducting material since the coating current is prevented from passing into the contact surface by the electrical insulation between the workpiece receiving area and the contact area of the conveyor device.

It may, in particular, be provided for the contact area of the conveyor device to comprise a metallic material, preferably be formed entirely from a metallic material.

Since the contact area of the conveyor device is not covered with a protective layer of dip paint, it is of advantage when the contact area of the conveyor device comprises a material which is corrosion-resistant in the electrophoretic dip paint bath.

Furthermore, it is favorable when the material of the contact area of the conveyor device is also corrosion-resistant in pretreatment baths preceding the electrophoretic dip paint bath.

It is particularly favorable when the contact area of the conveyor device comprises a stainless steel material, is preferably formed entirely from a stainless steel material.

In one preferred embodiment of the invention, it is provided for the workpiece carrier to be designed as a skid frame and for the contact area of the conveyor device to comprise at least one supporting surface of a skid runner.

The workpiece receiving area of the workpiece carrier can also comprise a metallic material, preferably be formed entirely from a metallic material.

It is of advantage when the workpiece receiving area comprises a material which can be coated in the electrophoretic dip paint bath since, in this case, the workpiece receiving area is provided in the electrophoretic dip paint bath with a protective layer consisting of dip paint and is protected by this protective layer against corrosion in the pretreatment baths and in the electrophoretic dip paint bath.

It is particularly favorable when the workpiece receiving area comprises a steel material.

This steel material can be normal steel.

In order to be able to suspend the workpiece carrier on a conveyor device, for example, a pendulum conveyor, it is favorable when the workpiece receiving area comprises at least one bell-shaped suspension device.

In order to prevent a deformation of the contact area of the conveyor device of the workpiece carrier having a negative influence on the workpiece receiving area, it may be provided for the workpiece receiving area to comprise at least two workpiece receiving sections which are separate from one another.

These workpiece receiving sections which are separate from one another are preferably connected to one another via an electrically conductive connecting element so that only one of the workpiece receiving sections need be provided with an electrical contacting device for introducing the coating current.

It is particularly favorable when the electrically conductive connecting element is designed to be variable in length since, in this way, any compression of the workpiece receiving sections during any deformation of the contact area of the conveyor device will be avoided as a result of a variation in length of the electrically conductive connecting element between the workpiece receiving sections.

In order to achieve the electrical insulation of the at least one contact surface from the at least one contacting device, it may be provided for the workpiece carrier to comprise at least one electrical insulation which comprises a ceramic material.

Alternatively or in addition hereto, it may also be provided for the workpiece carrier to comprise at least one electrical insulation which comprises an electrically non-conducting plastic material.

It may, in particular, be provided for the workpiece carrier to comprise at least one electrical insulation which comprises a polyphenylene sulfide material.

Such a material is known under the trade name of "Ryton".

The workpiece carrier preferably comprises at least one electrical insulation which is stable in the electrophoretic dip paint bath and in a drier following the electrophoretic dip paint bath.

It is particularly favorable when the electrical insulation is also stable in pretreatment baths preceding the electrophoretic dip paint bath.

The workpiece carrier according to the invention is particularly suitable for use in a paint plant for painting workpieces, in particular, vehicle bodies which comprises at least one electrophoretic dip paint bath, at least one conveyor device following the electrophoretic dip paint bath and at least one workpiece carrier according to the invention.

Such a paint plant can comprise, in addition, a drier which preferably follows the conveyor device.

Furthermore, such a paint plant can comprise at least one pretreatment bath.

The conveyor device of such a paint plant, which follows the electrophoretic dip paint bath, can be designed, in particular, as a roller conveyor.

The present invention also relates to a method of painting a workpiece, in particular, a vehicle body which comprises the following method steps:

Attaching the workpiece to a workpiece carrier;

conveying the workpiece held on the workpiece carrier through at least one electrophoretic dip paint bath, wherein a coating current is passed into the workpiece via at least one electrical contacting device of the workpiece carrier;

subsequently conveying the workpiece held on the workpiece carrier by means of a conveyor device, with which the workpiece carrier comes into contact at at least one contact surface.

The present invention is based on the additional object of creating a method of the type specified above, with which dip paint is prevented from rubbing off from the workpiece carrier in the conveyor device following the electrophoretic dip paint bath.

This object is accomplished in accordance with the invention, in that a workpiece carrier is used, with which at least one contact surface, at which the workpiece carrier comes into contact with the conveyor device following the electrophoretic dip paint bath, is insulated electrically from the at least one electrical contacting device.

Special developments of the method according to the invention described herein, the advantages of which have already been explained in the above in conjunction with special developments of the workpiece carrier according to the invention.

Additional features and advantages of the invention are the subject matter of the following description and the drawings illustrating one embodiment.

DETAILED DESCRIPTION OF THE INVENTION

Figure 1:
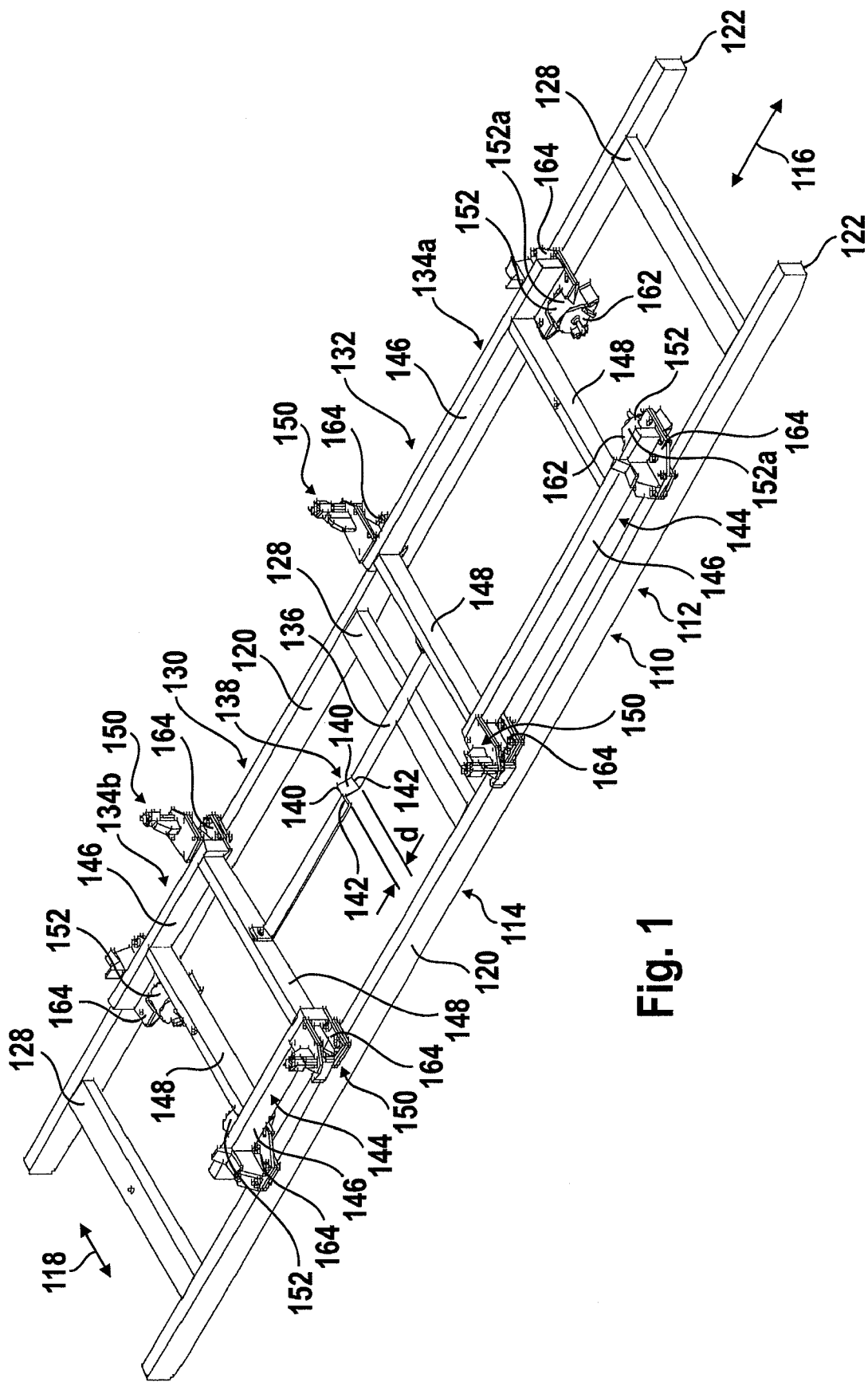
FIG. 1: shows a schematic perspective illustration of a skid frame with a contact area of the conveyor device and a workpiece receiving area subdivided into two separate sections.

The same or functionally equivalent elements are designated in all the Figures with the same reference numerals.

Figure 2:
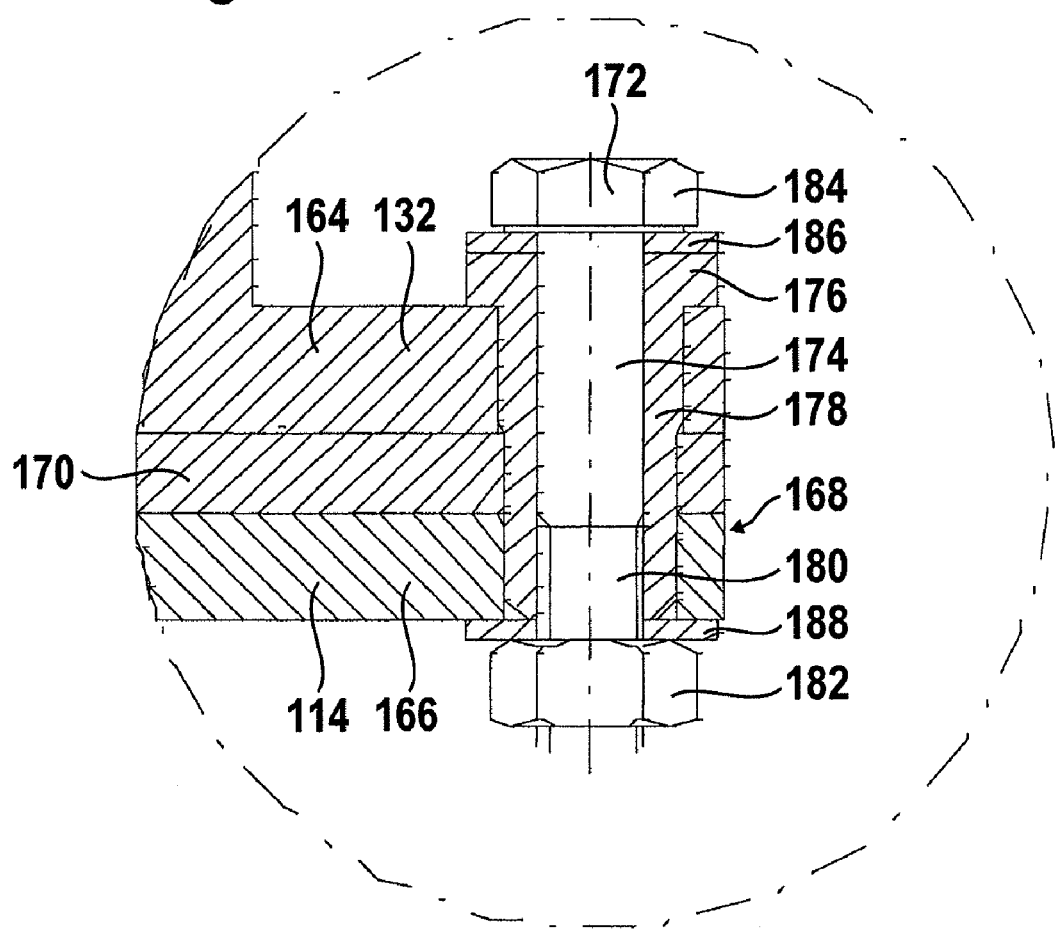
FIG. 2: shows a schematic vertical section through an electrical insulation of the skid frame from FIG. 1.
Figure 3:
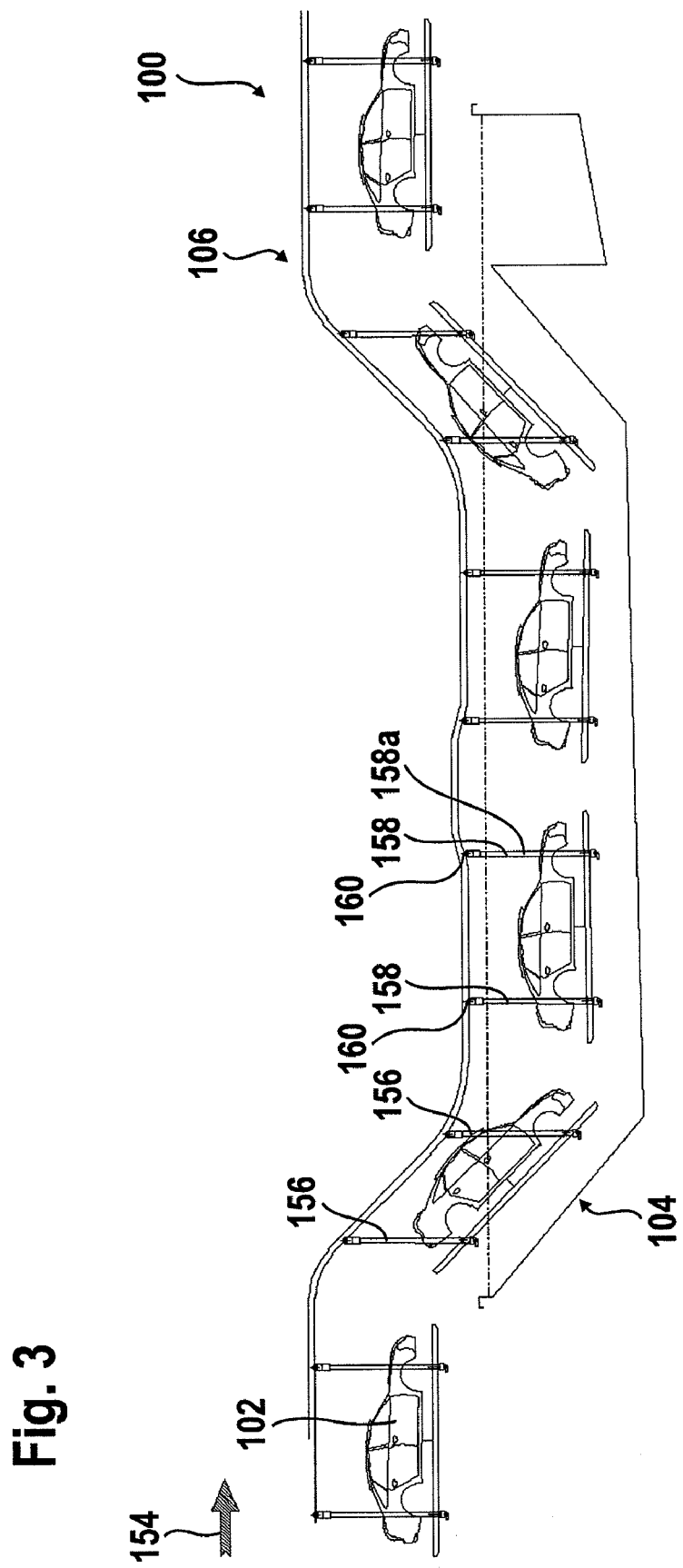
FIG. 3: shows a schematic side view of an electrophoretic dip paint bath and a pendulum conveyor which conveys vehicle bodies held on skid frames through the electrophoretic dip paint bath.
Figure 4:
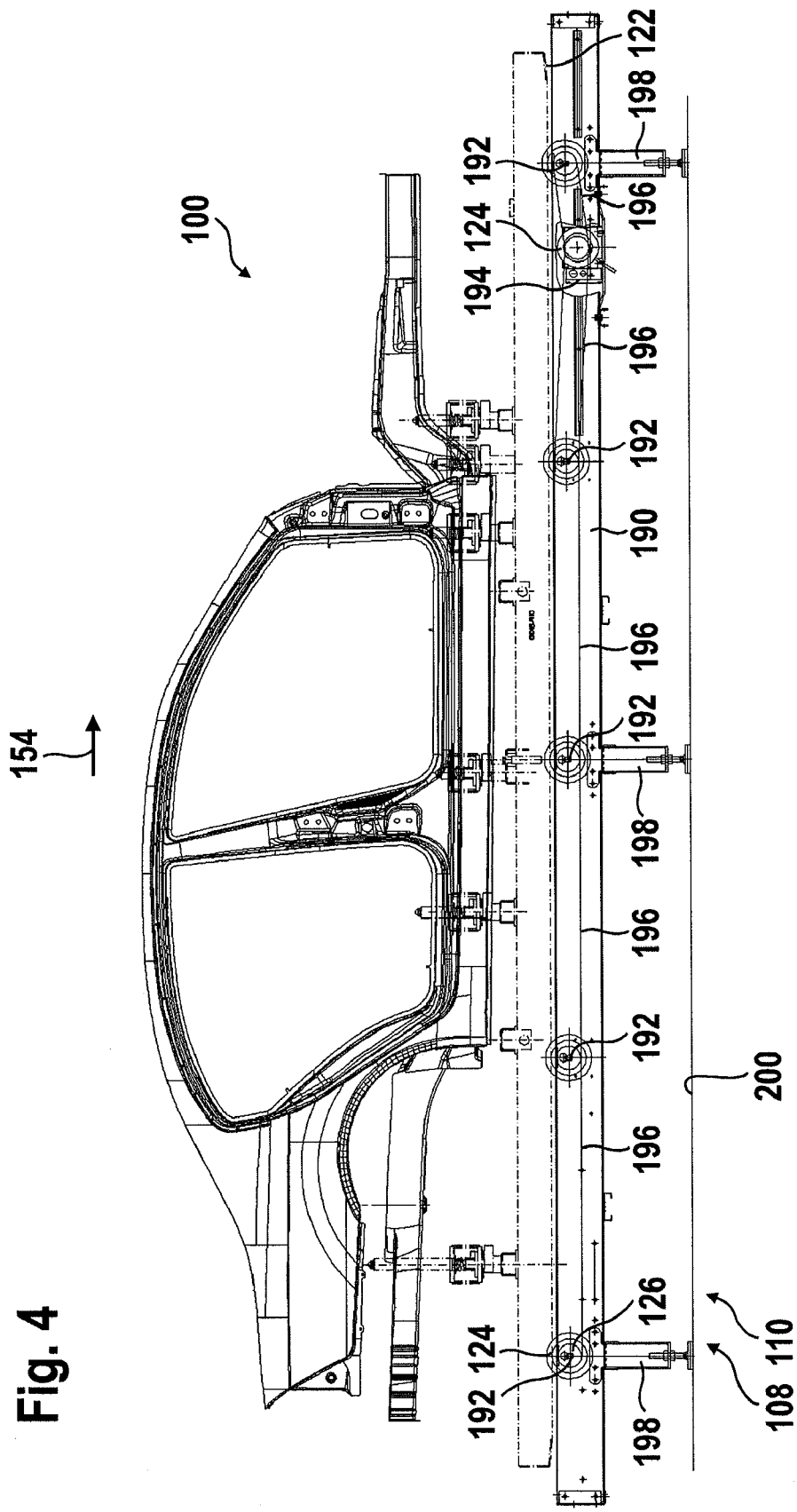
FIG. 4: shows a schematic side view of a section of a roller conveyor which follows the electrophoretic dip paint bath from FIG. 3 and on which the skid frame is supported with its skid runners.

A paint plant for painting vehicle bodies 102, sections of which are illustrated in FIGS. 1 to 4 and which is designated as a whole as 100, comprises an electrophoretic dip paint bath 104 illustrated schematically in FIG. 3, a pendulum conveyor 106 for conveying vehicle bodies 102 into the electrophoretic dip paint bath 104, through the electrophoretic dip paint bath 104 and out of the electrophoretic dip paint bath 104 again, a conveyor device 110, a section of which is illustrated in FIG. 4 and which is designed as a roller conveyor 108 and connects the exit of the electrophoretic dip paint bath 104 to the entry of a drier (which is not illustrated) for drying the painted vehicle bodies 102, the drier (not illustrated) for drying the painted vehicle bodies 102 as well as a plurality of pretreatment baths (not illustrated) which are arranged in front of the electrophoretic dip paint bath 104 in the direction of passage of the vehicle bodies 102, in particular, a degreasing bath and a phosphating bath.

For the purpose of conveying the vehicle bodies 102 through the paint plant 100, each vehicle body 102 is placed on a respective workpiece carrier 110 in the form of a skid frame 112, which is illustrated in detail in FIGS. 1 and 2.

Each of these skid frames 112 comprises a contact area 114 of the conveyor device which, for its part, comprises two skid runners 120 which are aligned parallel to the longitudinal direction 116 of the skid frame 112, are spaced from one another in the transverse direction 118 of the skid frame 112 and the undersides of which form contact surfaces 122, with which the skid frame 112 rests on the upper apex lines 124 of the rollers 126 of the roller conveyor 108 so that the skid frame 112 comes into contact with the roller conveyor 108 at these contact surfaces 122.

The two skid runners 120 are connected to one another by means of a plurality of, for example, three crossbars 128 which extend in the transverse direction 118 of the skid frame 112 and are spaced from one another in the longitudinal direction 116 of the skid frame 112 so that the skid runners 120 and the crossbars 128 form an interconnected frame 130.

Furthermore, each skid frame 112 comprises a workpiece receiving area 132 which, for its part, comprises a plurality of, for example, two workpiece receiving sections 134a and 134b which are spaced from one another in the longitudinal direction 116 of the skid frame 112 and are connected to one another via an electrically conductive connecting element 136.

The connecting element 136 is designed such that its length is variable within certain limits along the longitudinal direction 116 of the skid frame 112 and can be adapted to a varying distance between the front workpiece receiving section 134a and the rear workpiece receiving section 134b.

This variability in length can be achieved, for example, in that the connecting element 136 comprises an angular upward fold 138, the two arms 140 of which can tilt relative to one another when the connecting element 136 is acted upon by pressure or pulling and so the distance d between the base lines 142 of the arms 140, which face away from one another, can be enlarged during any pulling action on the connecting element 136 and reduced in size in the case of any pressure acting on the connecting element 136.

Each of the workpiece receiving sections 134 comprises a receiving frame 144 which is composed of longitudinal supports 146 which extend parallel to the longitudinal direction 116 of the skid frame 112 and cross supports 148 which extend parallel to the transverse direction 118 of the skid frame 112 and are connected to one another by two respective longitudinal supports 146.

At least one body receiving device 150 is arranged on each of the respective longitudinal supports 146 of the workpiece receiving sections 134 and these devices serve to lock the vehicle body 102 at the workpiece receiving area 132 and to provide an electrical contact between the vehicle body 102 and the workpiece receiving area 132 of the skid frame 112.

In this respect, any number of body receiving devices 150 can, in principle, be provided on the workpiece receiving area 132 at any number of positions in order to be able to mount vehicle bodies 102 with different dimensions on one and the same skid frame 112.

In order to be able to suspend the skid frame 112 on the pendulum conveyor 106 for the transport of the vehicle body 102 through the pretreatment baths and the electrophoretic dip paint bath 104, the workpiece receiving sections 134a, 134b are provided at their respective longitudinal supports 146 with a bell-shaped suspension device 152, as described, for example, in DE 198 39 725 C1, to which reference is expressly made with respect to the construction of this bell-shaped suspension device 152.

As is apparent from FIG. 3, the pendulum conveyor 106 comprises for each skid frame 112 two respective conveyor hangers 156 in the form of pendulums 158 which are spaced from one another in the direction of conveyance 154 and are each connected to a circulating conveyor chain of the pendulum conveyor 106 so as to be pivotable about upper pivot axes 160 which extend horizontally and transversely to the direction of conveyance 154.

In this respect, each skid frame 112 is suspended at the lower ends of two pendulums 158 with its suspension devices 152.

The suspension devices 152a located at the front in the direction of conveyance 154 serve at the same time as bell-shaped electrical contacting devices 162 which are in electrically conducting contact with electrical contacting devices on the pendulums 158a which are respectively located at the front in the direction of conveyance 154 and, as a result, make the introduction of a coating current into the front workpiece receiving section 134a possible and, from there, into the rear workpiece receiving section 134b, as well, via the electrically conductive connecting element 136. The coating current is passed from the two workpiece receiving sections 134a, 134b into the respective vehicle body 102 arranged on the skid frame 112 via the body receiving device 150.

The workpiece receiving area 132 of the skid frame 112 is held on brackets 166 which project from the skid runners 120 of the contact area 114 of the conveyor device of the skid frame 112 by means of brackets 164 which project from the longitudinal supports 146 of the workpiece receiving sections 134a, 134b and are arranged at each of the respective four corners of each workpiece receiving section 134a, 134b, wherein an electrical insulation 168 is arranged each time between the brackets 166 of the contact area 114 of the conveyor device and the brackets 164 of the workpiece receiving area 132 and this insulation comprises an insulating plate 170 inserted between the brackets 164 and 166 (cf. FIG. 2).

The brackets 164, 166 and the insulating plates 170 are fixed to one another by fastening screws 172, the shafts 174 of which each pass through a sleeve 178, which consists of an electrically insulating material and is provided with a collar 176, and are each secured at their lower ends by means of a nut 182 turned onto a thread 180.

The electrically non-conducting material of the insulating plates 170 and the sleeves 178 can, for example, be a ceramic material or an electrically non-conducting plastic material, for example, polyphenylene sulfide (PPS; trade name "Ryton").

The electrically insulating material of the insulating plates 170 and the sleeves 178 must be stable not only in the varying conditions of the pretreatment baths and the electrophoretic dip paint bath but also in the drier passed through following the dip painting (at temperatures of at the most about 200° C.).

As is apparent from FIG. 2, a washer 186 is arranged each time between the screw head 184 and the collar 176 of each sleeve 178.

Furthermore, a washer 188 is likewise arranged each time between each nut 182 and the lower end of the sleeve 178 or the underside of the bracket 166, respectively.

The washers 186 and 188 can be formed from an electrically conductive material, in particular, from a steel material since the electrical insulation required between the workpiece receiving area 132, on the one hand, and the contact area 114 of the conveyor device, on the other hand, is already ensured in the area of each fastening screw 172 by the sleeve 178 with collar 176 consisting of an electrically insulating material.

The contact area 114 of the conveyor device of the skid frame 112 is preferably formed from a metallic material which is chemically stable and does not corrode in the pretreatment baths as well as in the electrophoretic dip paint bath 104.

The chemical conditions of these baths are, in particular, the following:
Pretreatment degreasing bath with a temperature of up to 60° C. and a pH value of approximately 11;
pretreatment phosphating bath with a temperature of up to 60° C. and a pH value of approximately 2.6;
electrophoretic dip paint bath with a temperature of up to 32° C. and a pH value of approximately 6.8.

A suitable metallic material which is stable and does not corrode in the chemical conditions specified above is, in particular, a stainless steel material.

Such a stainless steel material can contain, in particular, at least approximately 10% by weight of chromium.

A suitable stainless steel material is, for example, the stainless steel with the material number 1.4301 according to EN 10088-3. The composition of this stainless steel material is, for example, as follows: 17.0 to 19.5% by weight of Cr; 8.0 to 10.5% by weight of Ni; at the most 0.07% by weight of C; the rest iron.

The workpiece receiving area 132 of the skid frame 112 is current-carrying in the electrophoretic dip paint bath 104 and so paint is deposited on the surfaces of the workpiece receiving area 132 and this protects the material located beneath it against corrosion after it has been burnt in in the drier.

The workpiece receiving area 132 need not, therefore, be manufactured from a stainless steel material but can be formed from normal steel.

Such a normal steel can, in particular, be a non-alloyed or low-alloy steel.

The steel with the material number 1.0037 according to Standard EN 10025 can be used, in particular, as normal steel for the workpiece receiving area 132; this steel is also known under the designations "St 37-2" according to Standard DIN 17 100 or "S235JR" according to Standard DIN EN 10 025. This steel material has, for example, the following composition: At the most 1.4% by weight of Mn; at the most 0.20% by weight of C; at the most 0.30% by weight of Si; at the most 0.050% by weight of P; at the most 0.050% by weight of S; at the most 0.009% by weight of N; the rest iron.

The roller conveyor 108 which follows the electrophoretic dip paint bath 104 and conveys the vehicle bodies 102 to the drier (not illustrated) comprises, in a frame-like structure 190, rollers 126 which are mounted for rotation about horizontal axes of rotation 192 and on the upper apex lines 124 of which each skid frame 112 rests with its contact surfaces 122.

The rollers 126 can be driven to perform a rotary movement about their axes of rotation 192 by means of a drive motor 194 and a belt drive which comprises toothed belts 196, whereby the respective skid frame 112 arranged on the roller conveyor 108 is conveyed along the direction of conveyance 154.

The structure 190, in which the rollers 126 are mounted for rotation, is supported on a base 200 via supporting legs 198.

The paint plant 100 described above for the electrophoretic dip painting of vehicle bodies 102 functions as follows:

Each vehicle body 102 is placed on the workpiece receiving area 132 of a skid frame 112 and locked to it at a feeder station (not illustrated) which is located in front of the first pretreatment bath in the direction of conveyance 154.

The skid frame 112 with the vehicle body 102 locked to it is suspended on two respective pendulums 158 of the pendulum conveyor 106.

Subsequently, the skid frame 112 with the vehicle body 102 locked to it is conveyed first of all through the pretreatment baths and, subsequently, through the electrophoretic dip paint bath 104 illustrated in FIG. 3, wherein the vehicle body 102 and the skid frame 112 are each dipped completely into the pretreatment baths and into the electrophoretic dip paint bath 104.

Electrical contact is made with the vehicle body 102 via the respective pendulums 158a located at the front in the direction of conveyance 154, the electrical contacting devices 162 on the front workpiece receiving section 134a, the electrically conductive connecting element 136 and the rear workpiece receiving section 134b as well as the body receiving device 150 and the vehicle body is brought to the desired coating voltage while passing through the electrophoretic dip paint bath 104.

If a cataphoretic dip painting (CDP) is carried out in the electrophoretic dip paint bath 104, each vehicle body 102 is at a negative potential while electrodes (not illustrated), which are arranged in the electrophoretic dip paint bath 104 along the path of conveyance of the vehicle bodies 102, are at a positive potential in comparison.

Since the coating current is passed into the workpiece receiving area 132 of the skid frame 112 via the electrical contacting devices 162, the workpiece receiving area 132 is current-carrying in the same way as the vehicle body 102 and so the surfaces of the workpiece receiving area 132 are coated with a protective layer of paint.

Since the coating of the workpiece receiving area 132 is not rubbed off again as a result of contact with a conveyor device, the thickness of the layer on the surfaces of the workpiece receiving area 132 increases until this coating of the workpiece receiving area 132 is terminated above a specific layer thickness on account of too great an electrical resistance being linked thereto.

No coating current is, on the other hand, passed into the contact area 114 of the conveyor device of the skid frame 112 which is electrically insulated from the workpiece receiving area 132 and, therefore, from the electrical contacting device 162 by the electrical insulations 168 and so no coating is formed on the surfaces of the contact area 114 of the conveyor device of the skid frame 112 in the electrophoretic dip paint bath 104.

After the vehicle body 102 arranged on the skid frame 112 has been lifted out of the electrophoretic dip paint bath 104, the skid frame 112 is removed from the pendulums 158 of the pendulum conveyor 106 and placed on the roller conveyor 108, a section of which is illustrated in FIG. 4 and which conveys the skid frame 112 with the vehicle body 102 locked on it to the dip paint drier.

In this respect, only the contact surfaces 122 on the undersides of the skid runners 120 come into contact with the rollers 126 of the roller conveyor 108. Since these contact surfaces 122, which are part of the contact area 114 of the conveyor device, are not, however, coated in the electrophoretic dip paint bath 104, no coating is present on these contact surfaces 122 which could be rubbed off as a result of contact with the roller conveyor 108 and, therefore, be distributed in the roller conveyor 108 or the subsequent drier.

The workpiece receiving area 132 of the skid frame 112 which is coated with dip paint does not come into contact with the roller conveyor 108 during its transport via the roller conveyor 108 and so the coating of paint present on the workpiece receiving area 132 cannot be rubbed off.

A build up of paint, which could be rubbed off by the conveyor technology at the places on the skid frame 112 where rubbing contact occurs between the skid frame 112 and the conveyor technology is effectively avoided in this way.

As a result of the bisectioning of the workpiece receiving area 132 into a plurality of sections, in particular, into a front workpiece receiving section 134*a* and a rear workpiece receiving section 134*b* it is possible to avoid a deformation of the frame 130 of the contact area 114 of the conveyor device of the skid frame 112 having any negative influence on the receiving frames 144 of the workpiece receiving sections 134*a*, 134*b*.

In particular, no compression of the receiving frames 144 of the workpiece receiving sections 134*a*, 134*b* occurs since any compression of the workpiece receiving sections 134*a* and 134*b* is prevented by a variation in length of the electrically conductive connecting element 136 between the workpiece receiving sections 134*a*, 134*b*.

The invention claimed is:

1. Workpiece carrier for conveying a workpiece to be painted through at least one electrophoretic dip paint bath and by means of at least one conveyor device following the electrophoretic dip paint bath,
    comprising at least one electrical contacting device for passing a coating current into the workpiece when the workpiece is conveyed through the electrophoretic dip paint bath and at least one contact surface, the workpiece carrier coming into contact with the conveyor device following the electrophoretic dip paint bath at said surface,
    wherein the at least one contact surface is electrically insulated from the at least one contacting device,
    wherein the workpiece carrier comprises a workpiece receiving area, the workpiece being held at said area, and a contact area of the conveyor device having the at least one contact surface, the workpiece carrier coming into contact with the conveyor device following the electrophoretic dip paint bath at said surface, and
    wherein the workpiece receiving area comprises at least two workpiece receiving sections separate from one another and connected to one another via an electrically conductive connecting element.

2. Workpiece carrier as defined in claim 1, wherein the workpiece receiving area and the contact area of the conveyor device are electrically insulated from one another.

3. Workpiece carrier as defined in claim 1, wherein the contact area of the conveyor device comprises a metallic material.

4. Workpiece carrier as defined in claim 3, wherein the contact area of the conveyor device comprises a stainless steel material.

5. Workpiece carrier as defined in claim 1, wherein the contact area of the conveyor device comprises a material corrosion-resistant in the electrophoretic dip paint bath.

6. Workpiece carrier as defined in claim 1, wherein the workpiece carrier is designed as a skid frame and wherein the contact area of the conveyor device comprises at least one supporting surface of a skid runner.

7. Workpiece carrier as defined in claim 1, wherein the workpiece receiving area comprises a metallic material.

8. Workpiece carrier as defined in claim 1, wherein the workpiece receiving area comprises a material adapted to be coated in the electrophoretic dip paint bath.

9. Workpiece carrier as defined in claim 1, wherein the workpiece receiving area comprises a steel material.

10. Workpiece carrier as defined in claim 1, wherein the workpiece receiving area comprises at least one bell-shaped suspension device.

11. Workpiece carrier as defined in claim 1, wherein the electrically conductive connecting element is designed to be variable in length.

12. Workpiece carrier as defined in claim 1, wherein the workpiece carrier comprises at least one electrical insulation comprising a ceramic material.

13. Workpiece carrier as defined in claim 1, wherein the workpiece carrier comprises at least one electrical insulation comprising an electrically non-conducting plastic material.

14. Workpiece carrier as defined in claim 13, wherein the workpiece carrier comprises at least one electrical insulation comprising a polyphenylene sulfide material.

15. Workpiece carrier as defined in claim 1, wherein the workpiece carrier comprises at least one electrical insulation stable in the electrophoretic dip paint bath and in a drier following the electrophoretic dip paint bath.

16. Workpiece carrier as defined in claim 1, wherein the workpiece is a vehicle body.

17. Paint plant for painting workpieces comprising at least one electrophoretic dip paint bath, at least one conveyor device following the electrophoretic dip paint bath and at least one workpiece carrier for conveying a workpiece to be painted through the electrophoretic dip paint bath and by means of the conveyor device following the electrophoretic dip paint bath,
    the workpiece carrier comprising at least one electrical contacting device for passing a coating current into the workpiece when the workpiece is conveyed through the electrophoretic dip paint bath and at least one contact surface, the workpiece carrier coming into contact with the conveyor device following the electrophoretic dip paint bath at said surface,
    wherein the at least one contact surface is electrically insulated from the at least one contacting device,
    wherein the workpiece carrier comprises a workpiece receiving area, the workpiece being held at said area, and a contact area of the conveyor device having the at least one contact surface, the workpiece carrier coming into contact with the conveyor device following the electrophoretic dip paint bath at said surface, and wherein the workpiece receiving area comprises at least two workpiece receiving sections separate from one another and connected to one another via an electrically conductive connecting element.

18. Paint plant as defined in claim 17, wherein the paint plant comprises a drier, in addition.

19. Paint plant as defined in claim 17, wherein the paint plant comprises at least one pretreatment bath.

20. Paint plant as defined in claim 17, wherein the conveyor device following the electrophoretic dip paint bath is designed as a roller conveyor.

21. Paint plant as defined in claim 17, wherein the workpieces are vehicle bodies.

22. Method of painting a workpiece comprising the following method steps:

attaching the workpiece to a workpiece carrier;

conveying the workpiece held on the workpiece carrier through at least one electrophoretic dip paint bath, wherein a coating current is passed into the workpiece via at least one electrical contacting device of the workpiece carrier; and subsequently conveying the workpiece held on the workpiece carrier by means of a conveyor device, the workpiece carrier coming into contact with said conveyor device at at least one contact surface;

wherein the at least one contact surface is electrically insulated from the at least one contacting device, and said workpiece carrier comprises a workpiece receiving area, the workpiece being held thereon, and a contact area of the conveyor device having the at least one contact surface, the workpiece carrier coming into contact with the conveyor device following the electrophoretic dip paint bath at said surface, and wherein the workpiece receiving area comprises at least two workpiece receiving sections separate from one another and connected to one another via an electrically conductive connecting element.

23. Method as defined in claim 22, wherein the workpiece receiving area and the contact area of the conveyor device are electrically insulated from one another.

24. Method as defined in claim 22, wherein the contact area of the conveyor device comprises a metallic material.

25. Method as defined in claim 24, wherein the contact area of the conveyor device comprises a stainless steel material.

26. Method as defined in claim 22, wherein the contact area of the conveyor device comprises a material corrosion-resistant in the electrophoretic dip paint bath.

27. Method as defined in claim 22, wherein the workpiece carrier is designed as a skid frame and wherein the contact area of the conveyor device comprises at least one supporting surface of a skid runner.

28. Method as defined in claim 22, wherein the workpiece receiving area comprises a metallic material.

29. Method as defined in claim 22, wherein the workpiece receiving area is coated in the electrophoretic dip paint bath at least partially.

30. Method as defined in claim 22, wherein the workpiece receiving area comprises a steel material.

31. Method as defined in claim 22, wherein the workpiece receiving area comprises at least one bell-shaped suspension device.

32. Method as defined in claim 22, wherein the electrically conductive connecting element is variable in length.

33. Method as defined in claim 22, wherein the workpiece carrier comprises at least one electrical insulation comprising a ceramic material.

34. Method as defined in claim 22, wherein the workpiece carrier comprises at least one electrical insulation comprising an electrically non-conducting plastic material.

35. Method as defined in claim 34, wherein the workpiece carrier comprises at least one electrical insulation comprising a polyphenylene sulfide material.

36. Method as defined in claim 22, wherein the workpiece carrier comprises at least one electrical insulation stable in the electrophoretic dip paint bath and in a drier following the electrophoretic dip paint bath.

37. Method as defined in claim 22, wherein the workpieces held on the workpiece carrier are conveyed to a drier following the electrophoretic dip paint bath by means of the conveyor device, the workpiece carrier coming into contact with said device at at least one contact surface.

38. Method as defined in claim 22, wherein the workpiece held on the workpiece carrier is conveyed through at least one pretreatment bath prior to passing through the electrophoretic dip paint bath.

39. Method as defined in claim 22, wherein the workpiece held on the workpiece carrier is conveyed by means of a roller conveyor after passing through the electrophoretic dip paint bath.

40. Method as defined in claim 22, wherein the workpiece is a vehicle body.

* * * * *